Figure 1:
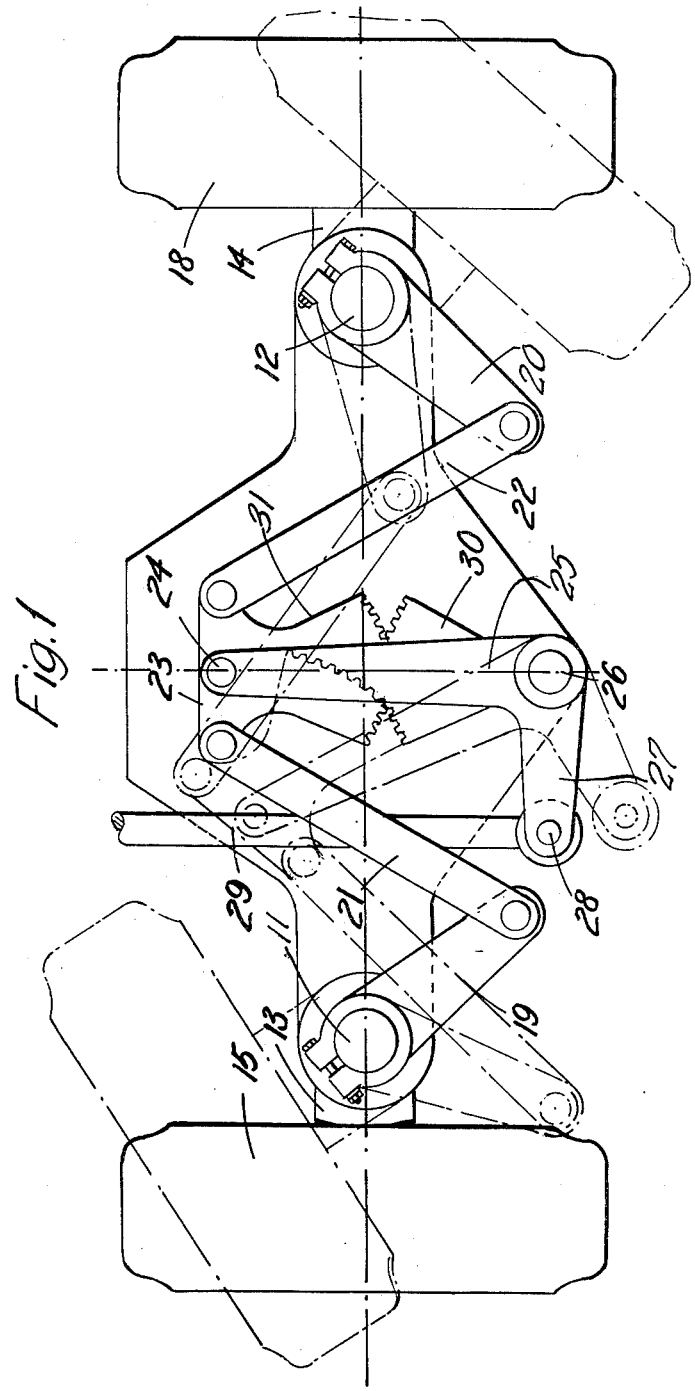

Oct. 23, 1962 C. GOODACRE 3,059,944
VEHICLE STEERING MECHANISMS
Filed Oct. 6, 1960 4 Sheets-Sheet 1

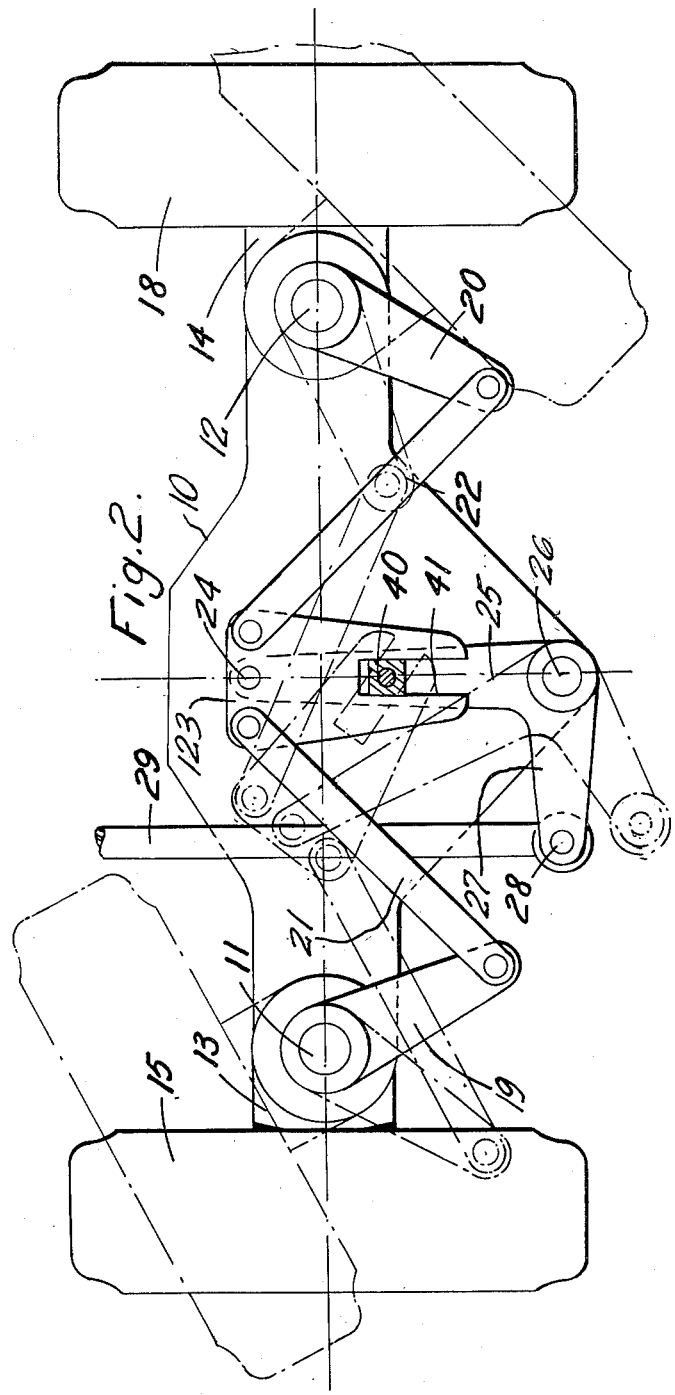

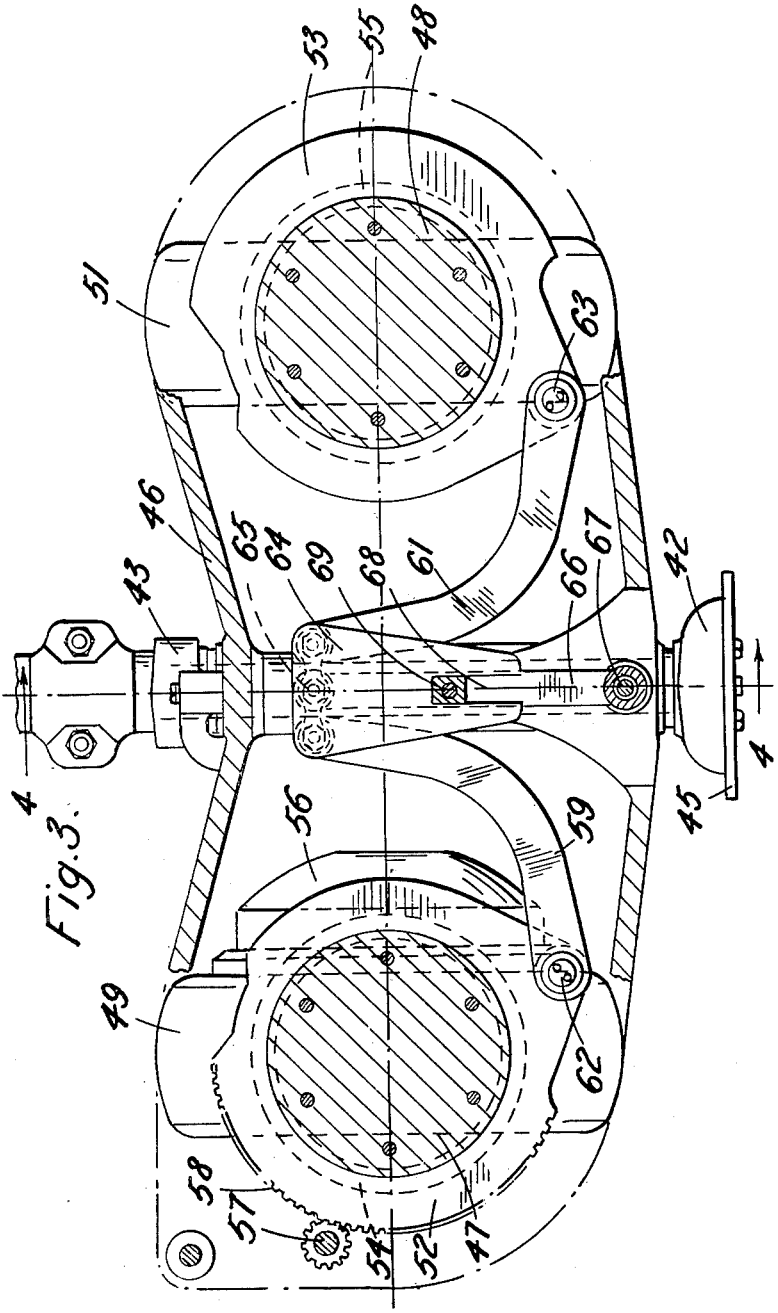

Oct. 23, 1962  C. GOODACRE  3,059,944
VEHICLE STEERING MECHANISMS
Filed Oct. 6, 1960  4 Sheets-Sheet 4
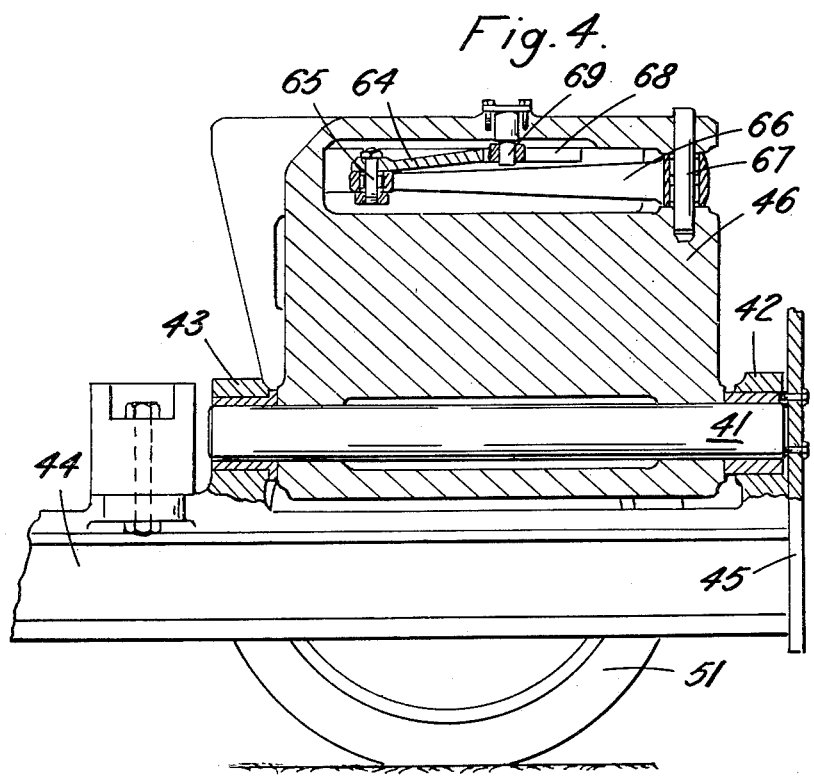

3,059,944
VEHICLE STEERING MECHANISMS
Cecil Goodacre, Basingstoke, England, assignor to Lansing Bagnall Limited, Basingstoke, England, a British company
Filed Oct. 6, 1960, Ser. No. 60,930
Claims priority, application Great Britain Oct. 7, 1959
4 Claims. (Cl. 280—95)

This invention comprises improvements in or relating to vehicle steering mechanisms.

As is well-known when vehicle steering wheels are mounted to swing about separate pivot points, it is necessary for the steering rotation about the king pin which lies toward the inner side of the curve along which the vehicle is to be steered to be greater than the rotation about the king pin which lies toward the outer side of the curve and various mechanisms have been proposed for producing the requisite difference of angular movement. With the usual steering mechanism known as the Ackerman mechanism the result is only approximately secured and the difference in accuracy is so considerable when a very pronounced steering lock is to be given that it results in "scrubbing" the tyres of the wheels on the ground surface as the vehicle turns. The Ackerman gear involves a single track-rod uniting two crank-arms on the king pin, which crank-arms are not parallel with one another. A nearer approach to accuracy could be obtained if two track-rods are used which are not in line with each other and are coupled to separated pivot points on an intermediate lever, but this again is not adequately accurate to avoid "scrubbing" with a very pronounced steering lock. It is an object of the present invention to provide an improved mechanism.

The present invention provides a steering mechanism for vehicle wheels wherein the wheels are coupled by a linkwork comprising two inclined track-rods secured to steering pivots on the wheel mountings and connected together by an intermediate link which is pivotally mounted on a swinging arm at a point intermediate the track-rods so that it is guided to move transversely to the fore-and-aft centre line of the vehicle, the link being further constrained to cant as it moves transversely so as to apply an increasing correcting movement to the track-rods.

In one embodiment the intermediate link carries a toothed sector which meshes with a toothed sector mounted on a fixed part of the vehicle so as to cause the link to cant about its intermediate pivot as it moves transversely. In a preferred embodiment the intermediate link is slotted and a pin mounted on a fixed part of the vehicle works in the slot and constrains the link to cant about its intermediate pivot as it moves transversely.

Constructions of steering mechanisms for vehicle wheels according to the invention will now be described by way of example, with reference to the accompanying drawings in which:

FIGURE 1 is a diagrammatic plan view of one construction showing a superimposed view in chain dotted lines of the mechanism in a second position, FIGURE 2 is a similar view of a second construction, FIGURE 3 is a similar view of a third construction, and FIGURE 4 is a sectional view on line 4—4 of FIGURE 3.

Referring to FIGURE 1 the steering mechanism comprises two king pins 11, 12 which are supported on the vehicle chassis 10 either directly if the wheels are unsprung, or on a sprung mounting as may be desired. The king pins 11, 12 carry wheel mountings in the form of stub axles 13, 14 on which are mounted steering wheels 15, 18. The king pins also carry lever arms 19, 20 which are connected respectively by two track-rods 21, 22 to an intermediate link 23. The intermediate link 23 is pivoted centrally between the track-rods 21, 22 at 24 to a swinging arm 25 which extends fore and aft of the vehicle when the steering is set for a straight line movement of the vehicle. The arm 25 is pivoted to the vehicle at 26 and has a lateral arm 27 which is connected by pivot pin 28 to a steering rod 29. On the vehicle, concentric with the pivot 26, is a fixed toothed sector 30, the radius of which is approximately half the distance between the pivots 24 and 26 of swinging arm 25. The intermediate link 23 has formed in one with it a toothed sector 31 to mesh with the sector 30. The direction of movement of the vehicle will be either forward or backward along the line which passes through the pivots 26, 24 when the mechanism is centralised. If the arm 25 is operated by the steering rod 29 to move anti-clockwise as viewed in the figure, the effect will be that the sector 31 rolling around the fixed sector 30 will cause the intermediate link 23 to cant anti-clockwise to a greater extent than the arm 25 as shown in the dotted position; consequently the angle between the lever arm 19 and the track-rod 21 will be decreased while the angle between the lever arm 20 and the track-rod 22 will be increased. The result will be that the transverse movement of the swinging arm 25 imparts a greater angular movement to the king pin 11 than to the king pin 12 and by suitably proportioning the parts in relation to the wheel base of the vehicle, the difference in angular movement can be made to follow very closely indeed the requisite amount to avoid "scrubbing" even up to the maximum possible swing of the king pins which, in the case of the pin 11 working on the inner side of the curve, may be as much as 80° from the position shown in full lines. If the swinging arm 25 is moved in the opposite direction, it will be the king pin 12 which receives the greater movement as the sector 31 cants in the opposite direction and, of course, in this case the king pin 12 will be on the inner side of the curve so that it needs the greater movement.

Referring to FIGURE 2, the parts here are similar and are similarly numbered as far as possible but instead of the provision of a fixed sector 30, there is a fixed pin 40 which engages a slot 41 formed in an intermediate link 123 in a direction which is radial to the pivot 24. The movement is similar to that already described with regard to FIGURE 1 and the correction applied to the angular swing of the king pins 11, 12 is equally accurate.

FIGURES 3 and 4 show a steering mechanism similar to that shown in FIGURE 2, when adapted to steer the rear wheels of a fork lift truck. The steering assembly is mounted for rocking movement on a shaft 41 running fore-and-aft of the truck. The shaft is journalled in bearings 42 and 43 mounted on the longitudinal frame member 44 of the truck. The rear bearing 42 abuts the end plate 45 of the truck.

The steering assembly is mounted in a casing 46 which extends transversely to the truck and has fixed to it two downwardly depending turret mountings 47, 48 for two steering wheels 49, 51. Two cup-shaped wheel mountings in the form of turntables 52, 53 are supported for steering movements on the turret mountings 47, 48 by means of ball-races 54, 55 (shown diagrammatically). The wheel mountings 52, 53 both have downwardly depending flanges (not shown) which carry axles to support wheels 49, 51. The wheel 49 is driven by a motor 56 and is directly steered by means of a pinion 57 which meshes with a tooth sector 58 on the periphery of the turn-table 52.

The steering wheels 49, 51 are coupled by two track-rods 59, 61 which are secured to steering pivots 62, 63 on the turn-tables 52, 53 and which are connected together by an intermediate link 64. The intermediate link 64 is pivoted centrally between the track-rods 59, 61 at 65 to a swinging arm 66 which extends fore and aft of the track when the steering is set for a straight line movement of the truck. The arm 66 is pivoted to the truck at 67. There is formed in the link 64 a slot 68 which is radial to the central pivot 65 of the link. A pin 69 which is secured to the truck engages the slot 68 and constrains the link to cant about the central pivot 65 when it is moved transversely to the truck. In this manner the steering movements transmitted from the wheel 49 through the track-rods 59 and 61 and the link 64 to the wheel 51 are corrected in the manner described with reference to FIGURE 1 so that "scrubbing" of the wheels is avoided.

The correction applied by the steering linkage is accurate even when the wheels are turned through angles of up to 80° and so this linkage is particularly suited to use on industrial trucks having wheels which take great loads and must also be capable of turning through large angles.

I claim:

1. A steering mechanism for a vehicle having a chassis, comprising two laterally spaced wheels, wheel mountings supported from the chassis for movement about steering axes, a track rod for each wheel mounting connected to a point on the mounting offset from the line joining the steering axes and nearer to the longitudinal centre line of the chassis than the axis of the wheel mounting to which it is connected, the track rods extending in the straight ahead position of the mechanism toward each other in an inclined direction so that they cross the said line joining the steering axes, an intermediate link pivotally joining the two track rods, said intermediate link having a portion offset toward the line joining the steering axes, means located at about said line for constraining said offset portion of the intermediate link from lateral movement, a swinging arm pivotally connected to the intermediate link and extending across said line and on the other side of said line being pivoted relatively to the chassis, and means for imparting steering movements to said mechanism.

2. A steering mechanism as claimed in claim 1 wherein said means for constraining said offset portion of the intermediate link comprise a slot in the intermediate link, and a pin mounted on a fixed part of the body and engaging the slot for sliding movement.

3. A steering mechanism as claimed in claim 1 wherein said means for constraining the offset portion of the intermediate link comprise a first toothed sector on the intermediate link and a second toothed sector mounted on a fixed part of the vehicle in meshing engagement with the first toothed sector so as to cause the link to cant about its intermediate pivot as it moves transversely.

4. A steering mechanism as claimed in claim 3 wherein the toothed sector carried by the link is concentric with the pivot of the intermediate link on the swinging arm and the fixed toothed sector is concentric with the pivot about which the swinging arm swings.

References Cited in the file of this patent

UNITED STATES PATENTS

| 2,187,197 | Dunham | Jan. 16, 1940 |
| 2,835,507 | Davies | May 20, 1958 |
| 2,900,195 | Carter | Aug. 18, 1959 |

FOREIGN PATENTS

| 671,236 | Great Britain | Jan. 11, 1950 |